United States Patent Office 3,397,122
Patented Aug. 13, 1968

3,397,122
PROCESS FOR PURIFYING β-CHLOROETHANE PHOSPHONIC ACID DICHLORIDE BY TREATMENT WITH A TERTIARY AMINE SALT
Kurt Sennewald, Knapsack, near Cologne, Alexander Ohorodnik, Liblar, Dieter Kirstein, Cologne-Lindenthal, and Hans-Joachim Hardel, Bruhl-Vochem, Germany, assignors to Knapsack Aktiengesellschaft, Knapsack, near Cologne, Germany, a corporation of Germany
No Drawing. Filed Nov. 15, 1967, Ser. No. 683,123
Claims priority, application Germany, Dec. 23, 1966, K 61,004
6 Claims. (Cl. 203—38)

ABSTRACT OF THE DISCLOSURE

β-Chloroethane phosphonic acid dichloride contaminated with β-chloroethane phosphate dichloride, is purified by heating the contaminated β-chloroethane phosphonic acid dichloride in the presence of catalytically active proportions of a halogen salt of a tertiary, aliphatic, aromatic or heterocyclic amine to a temperature between about 50 and 350° C. and by thermally splitting the β-chloroethane phosphate dichloride contaminant.

---

The present invention relates to a process for purifying β-chloroethane phosphonic acid dichloride contaminated with β-chloroethane phosphate dicloride, by subjecting the contaminants to thermal splitting in the presence of a suitable catalyst.

The production, particularly the commercial production, of β-chloroethane phosphonic acid dichloride from phosphorus trichloride, ethylene and oxygen in accordance with the following Equation I

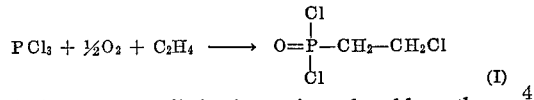

(I)

is found always to entail the formation of β-chloroethane phosphate-dichloride as a by-product, which is obtained as shown by the following Equation II

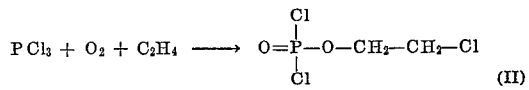

(II)

The proportion of by-product obtained averages about 20% by weight and is a function of the reaction conditions used.

For the contemplated use of β-chloroethane phosphonic acid-dichloride, e.g., for making vinyl phosphonic acid and its derivatives, which in turn can be used as insecticides, antiflame agents and the like, it is an essential requirement that fairly pure β-chloroethane phosphonic acid-dichloride be available. For example, the dehydrochlorination of β-chloroethane phosphonic acid-dichloride contaminated with 36% by weight β-chloroethane phosphate-dichloride has been found to produce vinyl phosphonic acid-dichloride in a yield as low as 35% of the theoretical. Pre-purified β-chloroethane phosphonic acid-dichloride on the other hand, enables vinyl phosphonic acid-dichloride to be obtained in improved yields exceeding 75% of the theoretical.

It has therefore been desirable to develop a process for the isolation of β-chloroethane phosphate dichloride from β-chloroethane phosphonic acid-dichloride. The rather obvious idea of subjecting a mixture of the above compounds to distillative separation is practically impossible to achieve or at least very expensive and uneconomical as the compounds, which are known to have a high boiling point at atmospheric pressure, have a boiling point of 88 and 89° C., respectively, under a pressure of 7 mm. mercury, where the slight boiling point difference does not enable them to be separated from one another by distillation.

It has now been found that β-chloroethane phosphonic acid-dichloride, contaminated with β-chloroethane phosphate-dichloride, can be obtained in pure form given that the contaminant is thermally split in the presence of a suitable catalyst and the resulting split products are isolated by distillation or in any other convenient manner from unchanged β-chloroethane phosphonic acid-dichloride.

The process of the present invention for the purification of β-chloroethane phosphonic acid-dichloride, contaminated with β-chloroethane phosphate-dichloride, comprises more especially heating the contaminated β-chloroethane phosphonic acid-dichloride in admixture with catlytically active proportions of a halogen salt of a tertiary, aliphatic, aromatic or heterocyclic amine to a temperature between about 50 and about 350° C., thermally splitting the β-chloroethane phosphate-dichloride contaminant with the resultant formation of 1,2-dichloroethane, hydrogen chloride, phosphorous oxychloride and meta-phosphoric acid, the split products, which are volatile at the splitting temperature, being continuously expelled from the mixture, and ultimately subjecting the remaining mixture, formed of metaphosphoric acid and β-chloroethane phosphonic acid-dichloride to distillation, if desired under reduced pressure, to isolate the said β-chloroethane phosphonic acid-dichloride.

The starting mixture to be purified usually contains β-chloroethane phosphate-dichloride in a proportion between about 5 and about 30% by weight.

It has been found advantageous to use the starting mixture in admixture with a catalyst proportion of about 0.01 to about 1% by weight, referred to the weight of the starting mixture. Useful catalysts are more especially halogen salts of trimethyl, triethyl or triphenyl amine or pyridine, quinoline or phenothiazine the hydrochloride being particularly preferred among the halogen salts.

The process of the present invention enables β-chloroethane phosphonic acid-dichloride, contaminated with β-chloroethane phosphate-dichloride, to be purified and obtained with a purity of more than 99% of the theoretical, the products obtained on thermally splitting the contaminant being suitable for widespread commercial uses.

EXAMPLE 1000 grams of a mixture formed of 640 grams (3.53 mols) β-chloroethane phosphonic acid-dichloride and 360 grams (1.82 mols) β-chloroethane phosphate-dichloride, were mixed with 1 gram pyridine hydrochloride and the whole was heated to a temperature of 150 to 160° C., inside a distilling apparatus. The contaminant underwent thermal splitting and produced gaseous split products issuing from the distilling apparatus. They were condensed to recover 134 grams (1.37 mols) 1,2-dichloroethane and 76 grams (0.7 mol) POCl₃. Once the splitting reaction was complete, β-chloroethane phosphonic acid-dichloride was recovered from the residue retained in the distilling apparatus by distilling the said residue at 150° C. under a pressure of 150 mm. mercury. 612 grams β-chloroethane phosphonic acid-dichloride were recovered, corresponding to a yield of 96%, referred to the quantity of that dichloride initially contained in the mixture; the dichloride was found to have a purity of 99%.

We claim:
1. A process for purifying β-chloroethane phosphonic acid-dichloride, contaminated with β-chloroethane phosphate-dichloride, which comprises heating the contaminated β-chloroethane phosphonic acid-dichlororide in ad- mixture with catalytically active proportions of a halogen salt of a tertiary amine selected from the group consisting of aliphatic, aromatic or heterocyclic amines, to a temperature between about 50 and about 350° C., thermally splitting the β-chloroethane phosphate-dichloride contaminant with the resultant formation of 1,2-dichloroethane, hydrogen chloride, phosphorus oxychloride and meta-phosphoric acid, the split products, which are volatile at the splitting temperature, being continuously expelled from the mixture, and ultimately subjecting the remaining mixture, formed of meta-phosphoric acid and β-chloroethane phosphonic acid-dichloride, to distillation to isolate the said β-chloroethane phosphonic acid-dichloride.

2. The process of claim 1, wherein the starting mixture to be purified contains about 5 to about 30% by weight β-chloroethane phosphate-dichloride.

3. The process of claim 1, wherein the starting mixture is used in admixture with a catalyst proportion of about 0.01 to about 1% by weight, referred to the weight of the starting mixture.

4. The process of claim 1, wherein the catalyst is a halogen salt of a member selected from the group consisting of trimethyl amine, triethyl amine, triphenyl amine, pyridine, quinoline or phenothiazine.

5. The process of claim 1, wherein the halogen salt is the hydrochloride of a tertiary amine selected from the group consisting of aliphatic, aromatic or heterocyclic amines.

6. The process of claim 1, wherein the β-chloroethane phosphonic acid dichloride is isolated from the said remaining mixture by distillation of the said mixture under reduced pressure.

References Cited

UNITED STATES PATENTS 3,183,264  5/65  Rochlitz _____ 260—543

FOREIGN PATENTS 1,103,922  4/61  Germany.
1,108,687  6/61  Germany.
1,123,667  2/62  Germany.

WILBUR L. BASCOMB, Jr., *Primary Examiner.*